Jan. 26, 1943.  H. F. PHILLIPS  2,309,532
MACHINE FOR RECONDITIONING BOWLING PINS
Filed Jan. 30, 1940  2 Sheets-Sheet 1
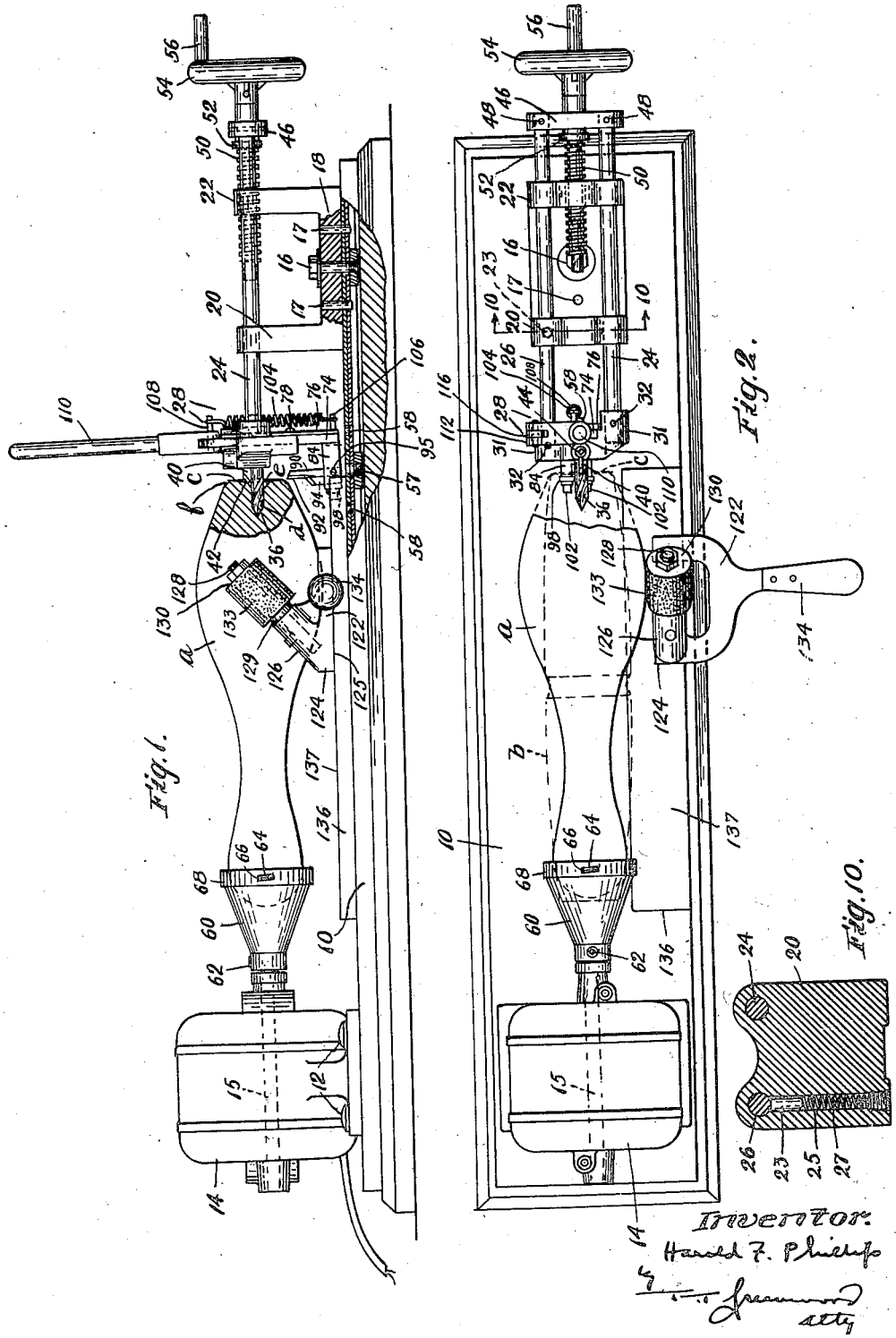

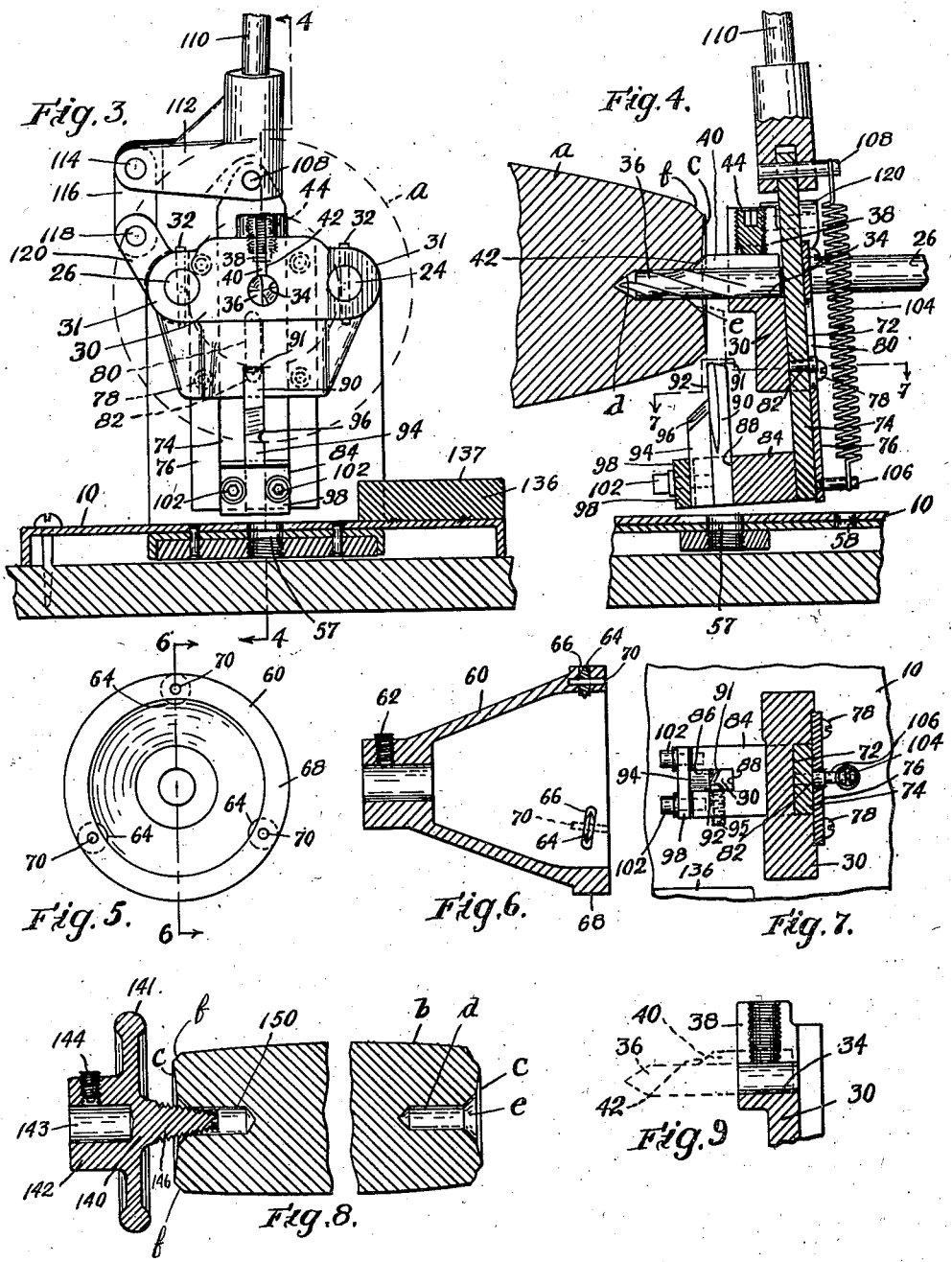

Patented Jan. 26, 1943

2,309,532

UNITED STATES PATENT OFFICE 2,309,532

MACHINE FOR RECONDITIONING BOWLING PINS

Harold F. Phillips, Belmont, Mass.

Application January 30, 1940, Serial No. 316,384

8 Claims. (Cl. 144—2)

The present invention relates to the re-conditioning of bowling pins.

Bowling pins such, for example, as duck pins, bottle pins, candle pins, and the like, are provided with a bottom supporting or bearing surface extending at right angles to the longitudinal axis of the pin. These supporting surfaces soon become broken, dented or otherwise damaged during use and, as a result, become rounded or reduced in area to such an extent that the pins will not stand up properly in the bowling alley. The damaged pins are repaired by having the irregular bearing or supporting ends thereof cut off or refaced.

Some attempts have been made in the past by the alley owner to reface the ends of the pins with generally unsatisfactory results because of improper equipment. Hence the pins are usually sent out to a machine shop for refacing. The result also is generally unsatisfactory because, even though a lathe is employed, the pin cannot be held properly to ensure accurate work expeditiously so that work is spoiled and pins are turned off more than is originally necessary. Furthermore, delays in returning the refaced pins are inevitable so that the alley operative has to maintain an extra supply of pins to take the place of those undergoing repairs. This increases the investment.

An object of the present invention is the provision of a relatively simple and inexpensive machine adapted for use by the alley operative for truing the ends of the pins and performing other refinishing operations to the pins.

In the machine of the present invention, the pin is driven by power and is operated upon by a relatively stationary tool which, however, is movable against and in cutting relation with the pin. One of the difficulties heretofore encountered in refinishing pins is the difficulty of maintaining the pin properly centered for rotation concentric with its longitudinal axis and for obtaining a good driving engagement with the pin.

Hence an object of the present invention is the provision of a novel form of pin chuck which can maintain a firm non-slipping grip on the rounded end of a duck or bottle pin, and also a candle pin, and permits ready release of the pin and yet will not deface the pin.

When work is turned in a lathe it is common to support the work between centers which hold the work against axial movement. Since the bottom face of a bowling pin has to be turned off over its entire extent the usual centers cannot be employed. Hence it is an object of the present invention to provide a driving chuck that engages the top end part of the pin and drives it and also holds it against axial displacement, and to provide means for holding the bottom part of the pin against sidewise movement.

The bottom end face of most pins has a cylindrical recess co-axial with the longitudinal axis of the pin. An object of the present invention is to provide a stud closely filling this recess to form an end support for the pin.

A yet further object of the invention is to provide the centering stud in the form of a drill that extends the length of the recess at the time a true bottom face is formed on the end of the pin.

An additional object of the invention is a tail stock for supporting the aforesaid drill, the tail-stock also carrying a cutting tool that is movable toward the drill and against the bottom face of the pin to retrue it.

Another object of the invention is to provide an improved rotatable holding or supporting device for the pin. As illustrated, this holder comprises a cup shaped member for receiving the end of the pin having adjacent its marginal portion a plurality of members arranged at an acute angle relatively to the axis of rotation of the holder and so arranged that pressure on the pin during the rotation thereof will tend to grip the end of the pin more securely as the pressure or resistance to rotation increases.

Another object of the invention is to provide an improved support for the base of the pin having means associated therewith for truing the base of the pin to provide a supporting surface which extends at right angles to the longitudinal axis of the pin.

The sides of pins also become dented and worn and an object of the present invention is a pin re-conditioning machine having a tool provided with a cutter engageable with and driven by the rotating pin for re-conditioning the side face thereof.

A still further object of the invention is to improve generally upon the construction and operation of machines for truing articles, such, for example, as bowling pins.

With the above and other objects and features in view the invention will now be described with reference to the accompanying drawings in which—

Fig. 1 is a view in front elevation illustrating a preferred embodiment of the present invention;

Fig. 2 is a plan view of the mechanism illustrated in Fig. 1;

Fig. 3 is a view in left hand elevation of the tailstock mechanism for supporting and re-conditioning the base of the pin;

Fig. 4 is a sectional view taken along the line 4—4 of Fig. 3;

Fig. 5 is a view in end elevation of a preferred form of chuck for supporting one end of the pin;

Fig. 6 is a view in section of the chuck taken along the line 6—6 of Fig. 5;

Fig. 7 is a horizontal sectional view taken along the line 7—7 of Fig. 4;

Fig. 8 illustrates a modified form of rotatable support for the head of a candle pin; and Fig. 9 is a detailed sectional view illustrating the bracket for supporting the center drill and countersink.

Fig. 10 is a sectional detail taken along line 10—10 of Fig. 2.

The machine of the present invention is designed to re-condition bowling pins such as the bottle pin illustrated at $a$, Fig. 1, a somewhat shorter type known as a duck pin, not illustrated, a candle pin, as illustrated at $b$ in dotted lines Fig. 2, and in general the usual types of pins. Of whatever the type of pin it may be, it is provided with a supporting base $c$ and an axial cylindrical bore or hole $d$. The base $c$ is flat or, preferably, dished so that the outer edge part only of the base engages the floor, to form a stable support for the pin. The mouth of the bore $d$ is countersunk as at $e$. With use the bottom edges and base surfaces become damaged as illustrated at the right hand end of the candle pin of Fig. 8, and a function of the present machine is to re-condition the surfaces by cutting off the damaged material and cutting a new surface. Since the pins belly out from the base so that the reconditioned bottom faces would increase in diameter with each re-conditioning operation, the machine is arranged to cut a chamfer $f$ at the edge of the bottom face to maintain the same diameter of bottom face regardless of its base diameter prior to re-facing, so that the "pin-fall" of all pins will be the same.

The pin re-conditioning machine of the present invention, and as herein illustrated, includes a flat horizontal base 10 formed of metal or any other suitable rigid material. The left hand end of the base 10 has secured thereto by suitable bolts 12, an electric motor 14 having a shaft 15 extending along the longitudinal axis of the base 10, the motor and its accessories forming the headstock of the machine. The other end of the base 10 has secured thereto by a suitable bolt 16 and aligning pins 17, which are illustrated in Fig. 1, a tailstock comprising a bracket 18 provided with a pair of vertically extending horizontally spaced arms 20, 22. The upper ends of the front and rear portions of the arms 20, 22 are provided with aligned openings for slidably receiving horizontally disposed slides or bars 24, 26 to the inner ends of which is fixed a bowling pin base supporting mechanism 28.

A brake pin 23, preferably of fibre, is located in a passage 25 in the arm 20 under the rod 26, see Fig. 10, and is pressed upwardly into frictional engagement therewith by a compression spring 27 for the purpose of preventing backward movement of the arms by vibration of the work and also to take up any looseness that may ultimately be present between the rods and the bracket 18.

The supporting mechanism 28 comprises, as shown best in Figs. 3 and 4, a vertically disposed casting 30 having bosses 31 adjacent to its upper end portion provided with horizontal openings in which the right hand ends of the rods 24 and 26 are fixed by suitable tapered pins 32. The casting 30, between the rods, is also provided with a horizontal opening 34 having its center disposed in alignment with the axis of rotation of the shaft 15 of the motor 14. The opening or hole 34 is arranged to receive a boring tool 36 or drill which is clamped in position, as will later be described. The casting 30 immediately above and opening into the side of the opening 34 is provided with a vertical slot or recess 38 for receiving a cutting tool 40 which is arranged to be clamped against the upper surface of the boring tool 36. The cutting tool 40 is provided with an inclined cutting surface 42 which is arranged to form a countersink at the end of the opening formed in a bowling pin by the boring tool 36. The boring tool 36 and the cutter member 40 are clamped into position in the casting 30 by means of a set screw 44 which is threaded into a substantially vertically extending threaded opening formed in the upper end of the casting 30. Thus when the lower end of the set screw 44 engages the top surface of the cutting tool 40, the cutting tool 40 bears against the top surface of the boring tool 36 and the set screw 44 maintains the two tools 36 and 40 rigidly in position in the casting 30.

The right hand ends of the rods 24 and 26 are connected together by a cross member 46 having horizontally spaced openings for receiving the right hand ends of the rods which are fixed to the connecting member 46 by suitable pins 48 extending through the connecting member and through each of the rods 24 and 26. The connecting member 46 is provided at about its middle portion with a horizontally extending opening in which is journalled the reduced right hand end portion of a feed screw 50. The extreme right hand end portion of the screw member 50 has fixed thereto a hand wheel 54 having thereon a crank pin 56 by means of which the screw 50 may be rotated in opposite directions. Said feed screw is prevented from axial movement in said connecting member 46 by said hand wheel and by an outstanding flange 52 of said screw.

The right hand bracket 22 of the support 18 is provided with a threaded opening in which the feed screw 50 is screw-threaded. Thus, when the screw is rotated in one direction or the other, the rods 24 and 26 and the parts connected thereto may be moved to the right or the left into and out of operative engagement with the base of a bowling pin $a$.

The different types of bowling pins are not all of the same overall lengths. Since only one type of pin is operated on at one session, in order to avoid the inconvenience of a long feed screw 50 and a long tailstock bracket, the tailstock bracket is so arranged that it may be moved bodily toward and away from the motor and clamped to the base in several predetermined positions. Two positions are herein provided as candle and bottle pins are about the same in length while duck pins are considerably shorter. For this purpose the base 10 is provided with an additional hole 57 to receive the clamping bolt 16 and additional holes 58 for the locating pins 17.

The other or head end part of the bowling pin $a$ is supported in the open end of a conical or cup shaped chuck 60 which is fixed to the shaft of the motor 14 by a suitable set screw 62. As shown best in Fig. 6, the chuck or supporting member 60 is hollow to receive the head end of a bowling pin $a$. The diameter of the opening in the member 60 is substantially equal to the maximum diameter of the head portion of the pin $a$. Thus the head of the pin can engage the inside walls of the cup shaped member 60 thereby properly centering the pin with respect to the axis of rotation of the shaft of the motor 14. The chuck 60 is provided with a plurality of wheels or discs 64 which are rotatably mounted in openings 66 formed in the marginal edge portion 68 of the chuck 60 adjacent to the open end thereof. The wheels 64 are located at an acute angle to the axis of rotation of the chuck 60 and are mounted on pins 70 which are driven through and held in holes bored from the open end of the chuck. The discs 64 are provided with relatively sharp peripheral edge portions and operate as screw sections to force the end of the head of the bowling pin $a$ against the inside of the cup so that, when the chuck 60 is rotated in an operating direction, the pin $a$ will be unable to rotate relatively to the chuck 60, thus holding the pin in position for the truing operation. As a matter of practice, however, the diameter of a circle that is tangent to the inner edges of the discs is slightly less than the maximum diameter of the head end of the pin and hence the discs dig into the head and grip the pin securely without screwing the pin against the inner face of the cup. The discs 64, however, are so arranged that removal of the bowling pin $a$ from the chuck 60 may be readily accomplished. When the chuck 60 is held stationary and the bowling pin is rotated in the direction of rotation of the motor 14, the discs 64 rotate thus releasing or unscrewing the head of the pin $a$ from the action of the discs 64.

It is evident from the above that the chuck 60 and the boring tool supporting mechanism 28 are so arranged that the bowling pin $a$ may readily be inserted in the chuck 60 and the boring tool 36 inserted in a central opening $d$ formed in the base of the pin to insure that the pin will be rotated about its geometric longitudinal axis. The chuck also holds the pin against axial displacement.

The supporting casting 30 at its right hand vertical edge portion is provided with a substantially vertically extending groove or guideway 72 which is arranged to receive a substantially vertically sliding plate 74. The groove 72, as shown most clearly in Fig. 4, is inclined upwardly toward the left hand end of the supporting casting 30. The inclination of this groove 72 is relatively slight and may form an angle with the vertical of approximately two degrees. The purpose of this angular relation of one base of the groove 72 to the vertical will later become apparent. The groove or way 72 at its right hand end is closed by means of a plate 76 which is fixed to the vertical casting 30 by means of suitable machine screws 78. The cover plate 76 is provided with a substantially vertically extending slot 80 which is arranged to receive a stop pin 82 which is fixed to the supporting plate 74. The upper end of the slot 80 determines the upper limit of movement of the supporting plate 74.

The sliding plate 74 at its lower end is provided with a laterally extending bracket portion 84 which is fixed to the slide plate 74 by any suitable means. The left hand end of the bracket member 84 is provided, as is best shown in Fig. 7, with a tool receiving recess 86 having a right hand end wall 88 which is parallel to the right hand face of the slide plate 74. The recess 86 is arranged to receive an upwardly projecting end-facing tool 90 having top and side cutting edges 91 and 92. The recess 86 is also arranged to receive an edge-chamfering tool 94 having a beveled cutting edge 96 which is arranged to engage the edge of the trimmed base portion of the bowling pin $a$ to eliminate the sharp peripheral edge formed by the cutting edge 92 of the cutting tool 90. The tools 90 and 94 are fixed in the recess 86 by a clamping plate 98 having a pair of openings therein for receiving clamping screws 102 which are threaded into openings formed in the laterally extending part 84. Thus when the clamping screws 102 are tightened, the cutting tools 90 and 94 are rigidly maintained in a predetermined adjusted position. The end-facing tool 90 is additionally held in its support by the set screw 95, Fig. 1, so that the position of the cutting face of the chamfering tool 94 can be separately adjusted for a proper diameter of pin-base.

The cutting tools 90 and 94, as best shown in Fig. 4, are normally maintained out of operative relation with the base of the bowling pin 58. The sliding plate or support 74 is normally maintained in its downward position by means of a spiral spring 104 which is fixed at its lower end to a pin 106 secured to the lower end of the cover plate 76 and at its upper end is fixed to a pivot pin 108 extending through the sliding plate 74.

In order to move the tools 90 and 94 upwardly and into operative relation with the base of the bowling pin $a$, a handle member 110 is provided which is pivotally secured to the sliding plate 74 by the pin 108 above referred to. The handle 110 at its lower end part is provided with a rearwardly extended arm 112 which at its end part has a pivot pin 114 extended therethrough which pivotally connects the arm with the upper end of a substantially vertically extending link 116. The lower end of said link is pivotally secured by a pin 118 to a rearwardly and upwardly extending bracket member 120 formed as a part of the casting 30.

Thus, when the handle member 110 is pushed rearwardly away from the operator, the slide plate 74 is moved upwardly against the tension of the spring 104 and hence moves the tools 90 and 94 upwardly at a slight angle to the longitudinal axis of the pin thereby forming a concave or dish shaped base on the pin $a$. The upper end of the cutting tool 90 is thus moved upwardly and slightly above countersunk portion of the hole formed by the boring tool 36 so that the entire base portion is trued or cut.

The side surfaces of the pins become dented or otherwise roughened or scored with use and should be reconditioned. To this end a hand operated tool 122 is provided. Said tool comprises a suitable base casting 124 having a broad flat bottom face 125 and an upwardly inclined post 126 in which a cutter-supporting shaft 128 is fixed. Said shaft is inclined preferably at an angle of about 45° with respect to the longitudinal axis of the bowling pin. Said shaft removably supports rotatably the hub 129 fixed to a drum or wheel 130 having an abrading or cutting periphery 133. Preferably the cutting surface is carried by a paper or fabric tube and the wheel is of rubber or like expansible material that when compressed endwise expands radially into tight engagement with the tube. This type of wheel is common in the art. The base 124 is provided with a suitable handle 134 by which the tool can be moved longitudinally of the bowling pin. The base 10 is provided with a raised ledge 136 having a flat top face 137 over which the tool 122 can be slid. Said ledge is located in front of and under the pin in the machine and is of sufficient length to provide support for the tool when the latter is engaged with any desired part of the side face of the pin. The ledge is of such height that the middle of the cutting wheel is about in the horizontal plane passing through the axis of the pin.

With the above described arrangement, when the cutting wheel is in engagement with the side of the rotating pin, the wheel will be caused to rotate. Since the wheel is at an angle with the surface of the pin, cutting particles in engagement with the wheel will have not only a component of motion that is in line with the line of rotation of the pin but also a component of motion that is in the axial direction of the pin. Hence the particles cut or abrade the pin surface and, by manual movements of the tool lengthwise of the pin, smooth the pin surface.

Referring now to Fig. 8 of the drawings, it will be noted that a different type of chuck or rotating support is provided. Said chuck 140 is provided with a hand wheel 141 and a boss 142, one side of the wheel having a hole 143 for receiving the shaft of the motor 14, and a set screw 144 for securing the chuck to the shaft. On the other side of the wheel the chuck 140 is provided with a screw-threaded conical member 146 which is coaxial with the shaft receiving hole 143. This type of chuck is designed to be used with double ended pins, such as candle pins, either end of which may be the supporting base. By this construction, the candle pin b is firmly and rigidly held and may be quickly and readily removed from the holding member 146, after the necessary operations have been performed on the candle pin. It is not necessary, however, that the machine be provided with the chuck or rotatable supporting member illustrated in Fig. 8, since a chuck as illustrated in detail in Figs. 5 and 6 also may be used to support the end of the candle pin.

Although the construction and operation of the machine have been described in detail, it might be well at this point, for a clearer understanding of the invention, to review briefly the operation of the machine. If it is desired to true the base of a bottle pin a, such as shown, for example, in Figs. 1 and 2, the operator will screw the head of the pin in the chuck 60 and will then rotate the wheel 54 to move the boring tool or drill 36 toward the left into the hole formed in the base of the pin, thereby supporting the pin at both ends. After this has been done the operator will start the motor 14 to rotate the pin a. The operator will then turn the wheel 54 to force the boring tool 36 still further into the base of the pin to drill the hole deeper and to bring the countersinking tool 40 into engagement with the base of the pin and also to bring the base-truing tool 90 over the end of the pin. The operator moves the handle 110 rearwardly thus raising the truing tool 94 to cut off the damaged wood at the base. The rotating pin will have its base trimmed or trued, with its outside edge portion beveled or chamfered by the tool 94. The handle 110 is then released and the cutters 90 and 94 will be returned to the position shown in Fig. 4 by the tension spring 104. The motor may then be stopped and the wheel 54 rotated in a reverse direction to withdraw the boring tool 36 from the recess or hole in the base of the pin. The operator will then grasp the chuck 60 and rotate the pin in a forward direction which will unscrew the pin from the holding discs 64, thus permitting removal of the pin from the chuck 60.

The same procedure may be substantially followed in operating upon a candle pin b, such as illustrated in Fig. 8. The chuck 60 of the type shown in Figs. 5 and 6 may be used if desired or preferred. The chuck disclosed in Fig. 8 may be used in either case. However, the procedure for fixing the end of the bowling pin to the chuck is the same. That is to say, when the chuck 60 is used it will be grasped by the operator, the head of the pin inserted and rotated rearwardly to cause the holding disc 64 to engage the head of the pin. If, on the other hand, the chuck 140 shown in Fig. 8 is to be used, the operator will grasp the chuck, insert the projection 146 in the opening 150 of the pin b and turn the pin b in a rearward direction to tighten or secure the pin to the chuck 140. With a candle pin, of course, it is necessary to true both ends. Thus, after one end has been trued, the pin may be removed, reversed, and placed back in the machine for a truing operation on the other end.

If it is necessary to re-condition the surface of the pin the hand tool 122 is used while the pin is in the machine.

It has been found by experience that a drill of common type cannot be used for the drill 36 since it heats and digs into the wood of the pin. The drill not only has to function as a drill in boring deeper the hole in the end of the pin but also has to act as a center on which the pin is rotatable. It has been found that a three-flute long twist drill with no relief on the flutes is best. That is to say, the three flutes give good support to the pin and the flutes, not being relieved back of their edges, present a broad cylindrical surface of one diameter and no cutting edge that would cut the wood and enlarge the hole. At the drill tip the flutes disappear and the drill has a conical unfluted tip which also acts as a lathe center in holding the pin against lateral displacement.

Having thus described my invention what I claim as new and desire to secure by Letters Patent of the United States is:

1. In a bowling pin re-conditioning machine, a tailstock having, in combination, a base, a supporting member slidably mounted in said base, a center drill removably secured to said supporting member, a countersinking tool removably secured adjacent to said boring tool, means for clamping the countersinking tool against the drill to maintain said tools in fixed position, a bracket member carried by said supporting member and arranged for sliding movement in ways formed in said supporting member, a cutter member fixed to said bracket member and having a substantially vertical cutting edge, and a second cutter member having a beveled cutting edge also secured to said bracket member, said cutter members and said bracket member being arranged to be moved at right angles to the path of movement of the supporting member for trimming the end of the bowling pin, and said bracket member and supporting member having cooperating means holding said bracket member from displacement away from the pin during the cutting movement of the bracket member.

2. In a bowling pin re-conditioning machine, a tailstock comprising a base, a pair of spaced horizontal rods arranged for sliding movement in openings formed in said base, a supporting member fixed to one end of said rods and extending substantially at right angles to said rod, a center-forming tool located in an opening in said supporting member, said center-forming tool acting also as a center support for a rotating bowling pin, a slide carried by said supporting member and movable toward and away from said center-forming tool, a cutter member carried by said slide and arranged for movement therewith to trim the end of a bowling pin, and an operating lever for said slide carried by said supporting member and having pivotal connections therewith and with said slide.

3. In a bowling pin reconditioning machine, a tailstock adapted to confront the base end of the rotating pin, said tailstock having a slide movable axially toward and away from the pin, a pin-center member carried by said slide coaxially with the pin and adapted to enter the end of and support the rotating pin, said slide having a guideway extending transversely of the line of movement of the slide, a tool holder slidable on said guideway transversely of the axis of the pin, a pin-base cutting tool carried by said tool holder in position to engage the pin-base and move thereacross, means constraining said tool holder on said guideway while permitting cutting movement of said tool holder thereon, and said guideway having parts cooperating with said tool holder to support it against all movement except movement transverse of the pin axis.

4. In a bowling pin reconditioning machine as in claim 3, an operating lever for reciprocating said tool holder on said guideway, said lever being movable with said slide and having a pivotal connection therewith and with said tool holder.

5. In a bowling pin reconditioning machine, a center drill holder, a facing tool holder, means for guiding said facing tool holder for movement transversely of the axis of the pin while preventing movement of said holder away from the pin during transverse movement, a movable support common to both said drill holder and said facing tool holder, and means for advancing said support and hence both holders concurrently in a direction axially of the pin positively towards the pin.

6. In a bowling pin reconditioning machine, a tailstock adapted to confront the base end of the rotating pin, said tailstock having a slide, means for advancing the slide axially of the pin toward and away therefrom and for holding the slide in any adjusted position thereof against accidental displacement from such position, a center drill carried by and movable with the slide for forming a center hole in the base of a rotating pin, an end-facing tool having means guiding it for movement by said slide transversely of the base of the pin and toward and away from said center drill, operating means for said end-facing tool, and means associated with said end facing tool for normally maintaining said tool in a predetermined position and for returning it to said position when moved therefrom.

7. In a bowling pin reconditioning machine, a tailstock adapted to confront the base end of the rotating pin, said tailstock having a slide movable axially toward and away from the pin, means for reciprocating said slide, a center drill carried by said slide and movable axially thereby into the end of the rotating pin, an end-facing tool carried by said slide reciprocable transversely of the axis of the pin across the base thereof and toward and away from said center drill, and means for guiding said end-facing tool in the aforesaid manner while maintaining a predetermined axially-fixed relation between said end-facing tool and the end of said center drill.

8. In a bowling pin reconditioning machine, a tailstock adapted to confront the base end of the rotating pin, said tailstock comprising a base, a slide including a pair of parallel spaced rods slidable in said base axially of the pin, a bracket fixedly connecting the similar ends of said rods adjacent the pin and a bar fixedly connecting the other ends of said rods, means for reciprocating said rods including a screw-threaded shaft parallel with said rods having means connecting it with said bar for conjoint axial movement of said shaft and rods but arranged for independent rotation, said screw-threaded shaft having a screw-threaded engagement with said base, a center drill fixed in said bracket and adapted to be moved by said slide into the center of the base of the rotating pin, an end-facing tool having a tool holder carried by and movable with said bracket and having a sliding connection therewith constraining it to move the facing tool transversely of the pin axis and across the end face thereof and toward and away from said center drill while maintaining a predetermined axial spacing between the tool and the end of the center drill, and means for reciprocating said tool holder including an operating handle carried by and movable with said bracket and having pivotal connections with said bracket and tool holder.

HAROLD F. PHILLIPS.